(12) United States Patent  
Kusunoki

(10) Patent No.: US 9,716,534 B2  
(45) Date of Patent: Jul. 25, 2017

(54) BASE STATION AND MASSIVE MIMO COMMUNICATION METHOD

(71) Applicant: Sony Corporation, Tokyo (JP)

(72) Inventor: Shigeo Kusunoki, Kanagawa (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 14/834,031

(22) Filed: Aug. 24, 2015

(65) Prior Publication Data

US 2016/0056867 A1   Feb. 25, 2016

Related U.S. Application Data

(60) Provisional application No. 62/041,408, filed on Aug. 25, 2014.

(51) Int. Cl.
*H04B 7/02* (2017.01)
*H04B 7/0413* (2017.01)
(Continued)

(52) U.S. Cl.
CPC ......... *H04B 7/0413* (2013.01); *H04B 7/0456* (2013.01); *H04B 7/0617* (2013.01); *H04B 7/0691* (2013.01); *H04B 7/0865* (2013.01)

(58) Field of Classification Search
CPC ..... H04L 1/0618; H04L 1/06; H04L 25/0204; H04L 27/2647; H04L 5/0007; H04L 27/2657; H04L 27/2662; H04L 5/0048; H04L 25/4902; H04L 1/0009; H04L 1/0041; H04L 25/49; H04B 7/0417; H04B 7/0669; H04B 3/54
(Continued)

(56) References Cited

U.S. PATENT DOCUMENTS

2006/0198459 A1* 9/2006 Fischer ................ H04L 1/0618  
375/267  
2008/0175183 A1 7/2008 Devroye et al.  
(Continued)

OTHER PUBLICATIONS

Marzetta, T.L., "Noncooperative Cellular Wireless with Unlimited Numbers of Base Station Antennas", IEEE Transactions on Wireless Communications, vol. 9, No. 11, pp. 3590-3600, (Nov. 2010).
(Continued)

*Primary Examiner* — Zewdu Kassa  
(74) *Attorney, Agent, or Firm* — Oblon, McClelland, Maier & Neustadt, L.L.P.

(57) ABSTRACT

A base station that includes a data control circuitry that processes a transmission signal to be simultaneously transmitted to a plurality of mobile terminals; a modulator circuitry that modulates the transmission signal processed by the data control circuitry; a radio frequency modulator circuitry that modulates the transmission signal modulated by the modulator circuitry into a radio frequency transmission signal; and a plurality of antennas that wirelessly transmit the radio frequency transmission signal to the plurality of mobile terminals. In a case that the number of the plurality of mobile terminals to which the transmission signal is to be transmitted is Nv and the number of the plurality of antennas is Nb, the data control circuitry multiplies the transmission signal by a precode matrix.

14 Claims, 7 Drawing Sheets

(51) Int. Cl.
*H04B 7/0456* (2017.01)
*H04B 7/06* (2006.01)
*H04B 7/08* (2006.01)

(58) Field of Classification Search
USPC ............... 375/267, 260, 259, 316, 295, 219
See application file for complete search history.

(56) References Cited

U.S. PATENT DOCUMENTS

2009/0274235 A1 11/2009 Lee et al.
2011/0150114 A1* 6/2011 Miao .................... H04B 7/0417
375/260
2013/0336418 A1* 12/2013 Tomeba ............... H04L 1/0003
375/267
2016/0065278 A1* 3/2016 Wang ................... H04B 7/0456
375/267

OTHER PUBLICATIONS

Rusek, F., et al. "Scaling Up MIMO", IEEE Signal Processing Magazine, pp. 40-60, (Jan. 2013).
Extended European Search Report issued Oct. 29, 2015 in Patent Application No. 15182233.5.
Chih-Hsiang Lin et al: "A Reduced-Complexity Multi-User MIMO Precoding. Scheme with Sorted-QR Decomposition and Block-Based Power Allocation", ITS Telecommunications (ITST), 2011 11$^{th}$ International Conference On, IEEE, XP-032064735, Aug. 23, 2011, 658-662 pages.

* cited by examiner

Antenna array with
Nb number of antennas

BASE STATION AND MASSIVE MIMO COMMUNICATION METHOD

CROSS-REFERENCE TO RELATED APPLICATIONS

This application claims the benefit of U.S. Provisional Application Ser. No. 62/041,408, filed Aug. 25, 2014, the entire contents of which are incorporated herein by reference.

FIELD OF THE DISCLOSURE

The base station for wireless communications, and massive MIMO communication method.

BACKGROUND

The amount of wireless communications by a portable or mobile terminal is increasing explosively by the propagation of smart phones. From now on, the form of the communication performed between apparatuses, not via a person, is also assumed as wireless communication. For this reason, the traffic amount of wireless communications may increase by 1,000-10,000 times in and after 2020, compared with the present. Therefore, research of a new communication system is actively underway. Manufacturers developing a radiotelephone system have previously focused their efforts to further improve the frequency usage efficiency of the radiotelephone system, rather than in the Long Term Evolution (LTE) and LTE-Advanced (LTE-A) communication systems of with which the business is done now. One of the leading techniques is a massive multiple-input and multiple-output (MIMO) communication system, which is generally a base station equipped with about one hundred antennas, and communicates with about ten sets of mobile terminals simultaneously.

In a massive MIMO communication system, the frequency usage efficiency can be maintained stably, without receiving most of the noise of a communication channel or the influence of early fading fluctuation. Moreover, in a massive MIMO communication system, channel capacity increases greatly compared with a conventional MIMO communication system. Therefore, the massive MIMO communication system is leading as a next-generation new technology.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

SUMMARY

Figure 1:
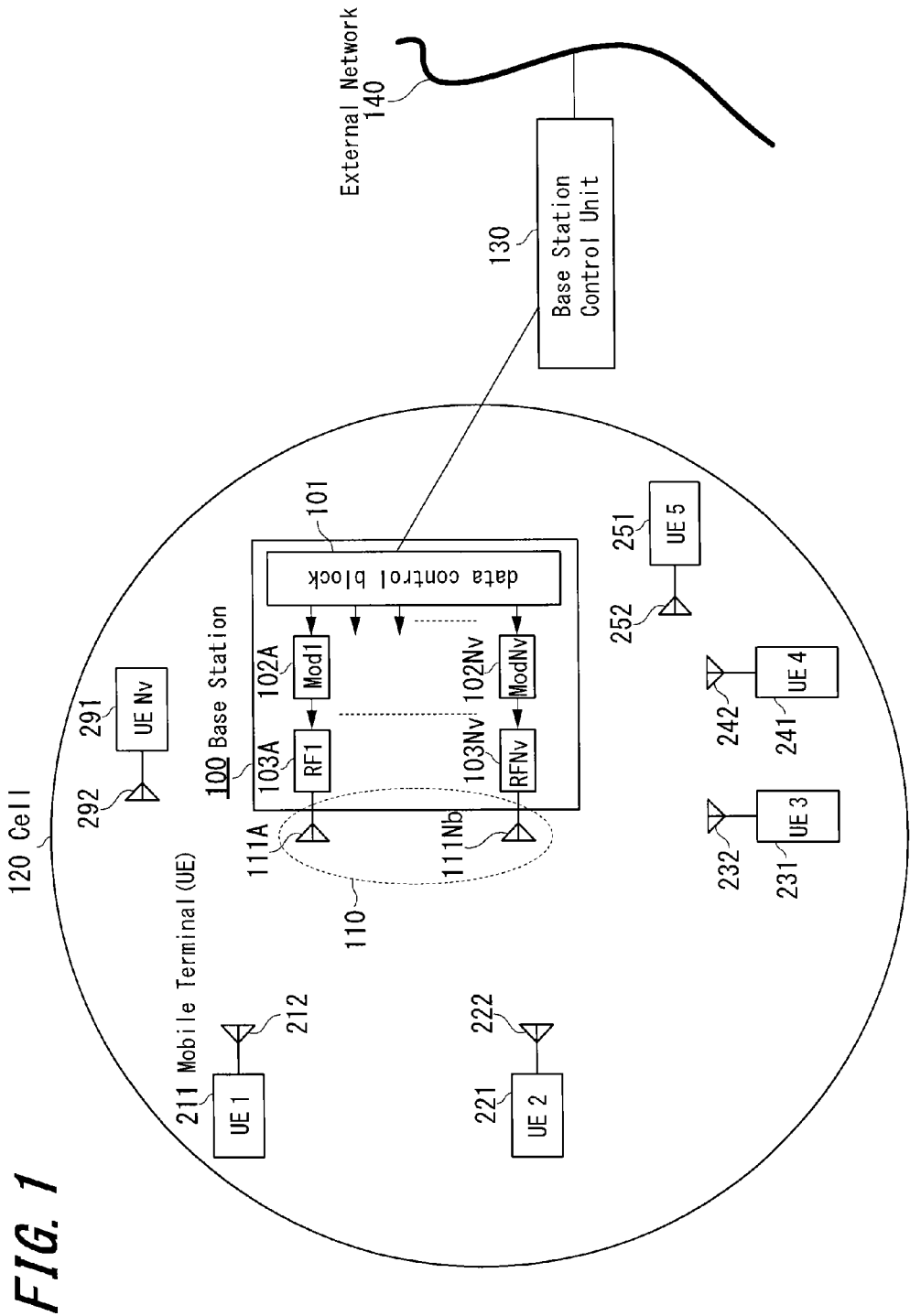
FIG. 1 shows an example of the system structure relating to the base station.

The present disclosure provides a base station that includes a data control circuitry that processes a transmission signal to be simultaneously transmitted to a plurality of mobile terminals; a modulator circuitry that modulates the transmission signal processed by the data control circuitry; a radio frequency modulator circuitry that modulates the transmission signal modulated by the modulator circuitry into a radio frequency transmission signal; and a plurality of antennas that wirelessly transmit the radio frequency transmission signal to the plurality of mobile terminals. In a case that the number of the plurality of mobile terminals to which the transmission signal is to be transmitted is Nv and the number of the plurality of antennas is Nb, the data control circuitry multiplies the transmission signal by a precode matrix.

DETAILED DESCRIPTION

The present disclosure is related to a massive MIMO communication system, where one base station is provided with hundreds of antennas to simultaneously perform wireless communication with dozens of mobile terminals. An object of this disclosure is to provide a massive MIMO communication system, which can remove interference of a signal transmitted from the base station to a terminal with small computational complexity. This is done by modulating the signal at the time of transmission from the base station by a precode, such that the signal received at each terminal is correlated with the terminal without requiring operations such as diagonalization etc. With such configuration, it becomes possible to increase the number of the mobile terminals with which the base station can simultaneously perform communication. Further, it becomes possible for the base station to modulate and transmit a signal with efficiency as high as in 16 Quadrature Amplitude Modulation (16QAM).

In a massive MIMO communication system, a number of mobile terminals, or terminals, with which a base station simultaneously performs communication may be given by Nv, the number of antennas of a base station may be given by Nb, and the channel matrix, which specifies the transmitting signal, may be given as H, and becomes [Nv×Nb]. H* is a conjugation-complex transposition of the channel matrix H.

The base station factorizes a correlation matrix H×H*, which is the multiplication of the matrix H by a matrix H*, into a lower triangular matrix L and an upper triangular matrix U, to thereby obtain the upper triangular matrix U. Further, the base station multiplies the inverse matrix $U^{-1}$ of the upper triangular matrix U by a transmission signal Tx having transmission data and transmits the result to the one or more mobile terminals in a transmission stream. At the time of transmission from the base station, when multiplying by H* as precoding, the reception of each terminal becomes H×H*·(transmission data). Here, non-diagonal elements of the correlation matrix H×H* become smaller compared with the diagonal elements if the correlation between different channels is low.

As a result, the technique is characterized by the method of modulating a signal so that a mobile terminal, given by UE, receives a signal uniquely for that mobile terminal without performing an operation, such as diagonalization, or the like. Also, noise superimposed on a channel is reduced by the correlation matrix, because auto- and cross-correlation of the noise itself is low. Further, it becomes possible to perform reception that is less subject to the influence of signal noise as a result.

If a non-diagonal element of the correlation matrix H×H* has low correlation between different channels, it will become small compared with a diagonal element. For this reason, the signal for its terminals can be received at a terminal, without operating diagonalization etc. Moreover, since the noise contained in each signal of a channel matrix has low cross-correlation with the whole channel matrix, the noise can be reduced by the correlation matrix as well. Therefore, the influence of a signal to noise ratio (S/N) is minimized in this massive MIMO communication system.

However, in practice, the non-diagonal elements of the correlation matrix H×H* do not become completely zero. The state of the received signals of a series of terminals communicating with the base station is given by Formula 1.

$$G \cdot Tx = H \cdot H^* \cdot Tx \quad \text{Formula 1}$$

$$= \begin{bmatrix} h00 & h01 \\ h10 & h11 \\ & & \ddots \end{bmatrix} \begin{bmatrix} h00^* & h01^* \\ h10^* & h11^* \\ & & \ddots \end{bmatrix} \begin{bmatrix} Tx \end{bmatrix}$$

$$= \begin{bmatrix} \sum hjj^2 & \sum hij \cdot hkl^* & \sum hij \cdot hkl^* \\ \sum hij \cdot hkl^* & \sum hjj^2 & \sum hij \cdot hkl^* \\ & & & \ddots \end{bmatrix} \begin{bmatrix} Tx \end{bmatrix}$$

$$= \begin{bmatrix} (Tx0 \cdot \sum hjj^2 + Tx1 \cdot \sum hij \cdot hkl^*) & \cdots \\ (Tx1 \cdot \sum hij \cdot hkl^* + Tx1 \cdot \sum hjj^2) & \cdots \\ \vdots \end{bmatrix}$$

where the correlation matrix H×H* is given by G and the transmitting signal is given by Tx. The first term in the reception matrix (Tx0·Σhjj²+Tx1·Σhij·hkl*) describes the reception signal of a first terminal UE#1. When the channel is uncorrelated, it is anticipated that the non-diagonal elements of Formula 1 will be small due to the uncorrelated values. That is, in the part of the received signal of terminal UE#1 in Formula 1, the 1st term is a signal that terminal UE#1 should receive. After the 2nd term, the signals that are meant for the other terminals UE#2, UE#3, . . . to receive are mixed as interference terms. When the correlation is low, the addition result after the 2nd term becomes a very small value compared with the 1st term, and a correlation value shows a limited value.

Moreover, the interference term of a certain terminal increases only by the number of other terminals. Therefore, a sum of interference terms, or an interference amount, increases only because the number of terminals that the base station communicates simultaneously increases. When the sum of interference terms increases, the quality of the received signal worsens. In order to avoid this, the base station further needs to increase the number of antennas, whereby the total correlation value can be made smaller.

An object of the present disclosure is to provide a communication method for massive MIMO communication. Multiple embodiments are disclosed in order to solve the above-described problem. As explained above, this disclosure triangular-factorizes a channel correlation matrix H×H*, and multiplies it to a transmitting signal by a precode matrix. In the preferred embodiment explained above, an inverse matrix $U^{-1}$ of the upper triangular matrix U is set as the precode matrix. In another embodiment, this disclosure multiplies each element $U_{ij}$ of the upper triangular matrix U of a triangular matrix by a gain gi, multiplies each element $L_{ij}$ of the lower triangular matrix L by a gain 1/gi, and sets the inverse matrix $L^{-1}$ of the lower triangular matrix L as the precode matrix.

Referring now to the drawings, wherein like reference numerals designate identical or corresponding parts throughout the several views.

FIG. 1 (FIG. 1) shows the system structure relating to the base station as an example of one embodiment of this disclosure. The base station 100 is connected to an external network 140 through a base station control unit 130. A cell 120 is a range that an electromagnetic wave from the base station 100 reaches. The base station 100 performs wireless communications with a plurality of mobile terminals 211, 221,231, . . . 291 in the cell 120 with a massive MIMO communication system. A mobile terminal 211,221,231, . . . 291 may be in possession of a user, as well as a position in the cell 120 that moves with them at any time. The base station 100 is equipped with an antenna array 110 having Nb number of antennas, by which the antenna 111A-111Nb (here Nb=100) are arranged. The base station 100 is further equipped with a data control block 101, which receives the transmission signal or the transmission data. The transmission data obtained in the data control block 101 are supplied to respectively separate modulators 102A-102Nv, and are modulated. The signal modulated by each modulator 102A-102Nv is modulated by a transmit frequency by respectively separate radio frequency modulators 103A-103Nv, and is supplied to the antenna 111A-111Nb. The base station 100 transmits signals simultaneously from the antenna 111A-111Nb, and wireless communication is performed simultaneously with mobile terminals 211,221,231, . . . 291. Each mobile terminal 211,221,231, . . . 291 is equipped with at least one piece(s) of antenna 212,222,232, . . . 292 as an antenna for reception.

The data control block 101, the base station control unit 130, the external network 140, the modulators 102A-102Nv, and the radio frequency modulators 103A-103Nv can be circuitry, such as a processing circuitry that is configured to execute one or more sequences of one or more instructions contained in a memory. One or more processors in a multi-processing arrangement may also be employed to execute the sequences of instructions contained in the memory. In alternative embodiments, hard-wired circuitry may be used in place of or in combination with software instructions. Thus, embodiments are not limited to any specific combination of hardware circuitry and software.

Figure 2:
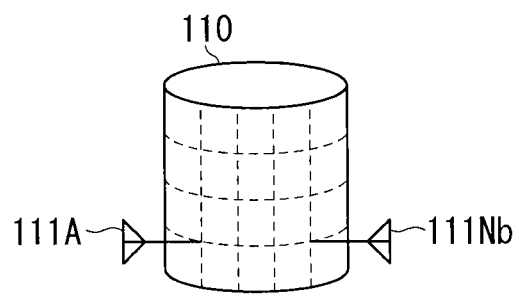
FIG. 2 shows an example of a structure of the antenna array.

FIG. 2 (FIG. 2) shows an example of a structure of the antenna array 110. The antenna array 110 is equipped with Nb number of antenna 111A-111Nb. The antenna 111A-111Nb are arranged in a cylindrical shape, as shown.

Figure 3:
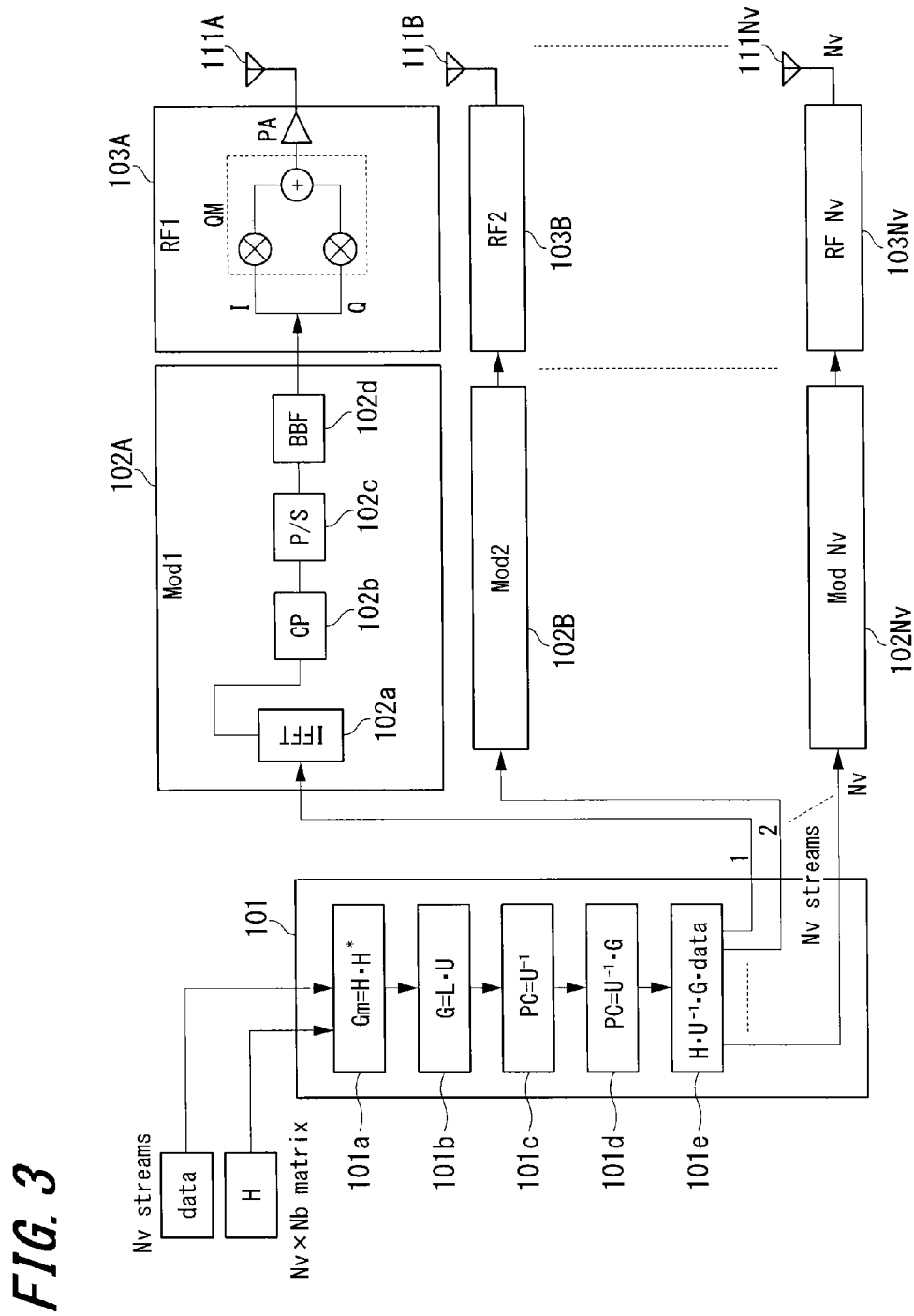
FIG. 3 shows a block diagram of the base station structure.

FIG. 3 (FIG. 3) shows an example of a structure of the base station 100 according to an exemplary embodiment. The base station 100 is shown equipped with the data control block 101. In the data control block 101, the transmission signal of the Nv terminals and the data of the [Nv×Nb] matrix, which determines the channel matrix H, are supplied. The transmitting signal or data stream of the Nv-th terminal and the data of the [Nv×Nb] matrix are supplied to a correlation matrix calculation part 101a. The correlation matrix calculation part 101a generates a correlation matrix Gm=[H×H*] based on the channel matrix H and the transmission signal. The correlation matrix [H×H*] generated in the correlation matrix calculation part 101a is supplied to a LU decomposition part 101b. The LU decomposition part 101b decomposes the correlation matrix [H×H*] into the product of the lower triangular matrix L and the upper triangular matrix U. The upper triangular matrix U obtained in the LU decomposition part 101b is supplied to an inverse-matrix calculation part 101c. The inverse-matrix calculation part 101c generates the inverse matrix $U^{-1}$ of the upper triangular matrix U by a calculation. The inverse upper triangular-matrix $U^{-1}$ obtained in the inverse-matrix calculation part 101c is supplied to a precode generation part 101d. In the precode generation part 101d, a precode matrix (PC) containing the inverse upper triangular matrix $U^{-1}$ is generated as PC=$U^{-1}$*G. The precode generated in the precode generation part 101d is multiplied by the transmission data in a precode multiplication part 101e and the data stream of the Nv-th terminal is generated.

The data stream of the Nv-th terminal obtained in the precode multiplication part 101e is supplied to respectively separate modulators 102A, 102B, . . . , 102Nv. This data stream of the Nv-th terminal is the data of the component of a column in number of Nv of the precode matrices [Nv×Nb] generated in the data control block 101. In each modulator 102A, 102B, . . . , 102Nv, an input signal is supplied to an IFFT section 102a, which performs an reverse fast Fourier transformation (IFFT) process. The signal to which the IFFT process was performed is supplied to a CP addition part 102b, and a cyclic prefix CP is added. The signal to which the cyclic prefix CP was added in the CP addition part 102b is supplied to a parallel and serial conversion part 102c, and is converted into serial data.

Furthermore, the serial data converted in the parallel and serial conversion part 102c are supplied to a baseband filter 102d. In the baseband filter 102d, a waveform shaping process and the removal processing of quantized noise are performed. The signal which the baseband filter 102d outputs is supplied to respective radio frequency modulators 103A-103Nv. The baseband filter 102d outputs a signal by which Orthogonal Frequency Division Multiplexing (OFDM) modulation was carried out. The resulting transmitting signal is separated into an I component (In-phase) and an Q component (Quadrature) by the radio frequency modulators 103A-103Nv. A quadrature modulator QM modulates a transmit frequency carrier wave by the I component and the Q component, and then mixes the transmit frequency carrier wave with a transmitting signal. The resultant mixed transmitting signal is supplied to the antenna 111A-111Nb of each series through an amplifier (PA).

The correlation matrix calculation part 101a, the LU decomposition part 101b, the inverse-matrix calculation part 101c, the precode generation part 101d, the IFFT section 102a, the CP addition part 102b, the parallel and serial conversion part 102c, and the baseband filter 102d can be circuitry, such as a processing circuitry that is configured to execute one or more sequences of one or more instructions contained in a memory. One or more processors in a multi-processing arrangement may also be employed to execute the sequences of instructions contained in the memory. In alternative embodiments, hard-wired circuitry may be used in place of or in combination with software instructions. Thus, embodiments are not limited to any specific combination of hardware circuitry and software.

Here, a detailed description will be given of an embodiment of the present disclosure. The transmission process performed by the base station 100 is explained using numerical formulas with respect to the transmitting signal. When a precode matrix is given by PC, a transmitting signal is given by Tx, and a channel matrix is given by H, a receiving signal Rx which the terminal receives will be given by Formula 2.

$$Rx = H \times H^* \times PC \times Tx \quad \text{Formula 2:}$$

Here, the precode matrix PC is an inverse matrix of the upper triangular matrix U, when a correlation matrix [H×H*] is decomposed into the lower triangular matrix L and the upper triangular matrix U. That is, when Formula 3 holds, the precode matrix PC is given by Formula 4.

$$H \times H^* = L \times U \quad \text{Formula 3:}$$

$$PC = U^{-1} \quad \text{Formula 4:}$$

Formula 2 and Formula 3 are substituted into Formula 4; thereby, the received signal Rx of the terminal is given by Formula 5.

$$Rx = H^* H^{**} U^{-1} * Tx = L * U * U^{-1} * Tx = L * Tx \quad \text{Formula 5:}$$

In Formula 3, L is a lower triangular matrix and U is an upper triangular matrix. Generally the lower triangular matrix L and the upper triangular matrix U become the following forms.

$$L = \begin{bmatrix} l_{00} & 0 & 0 & 0 & \cdots \\ l_{10} & l_{11} & 0 & 0 & \cdots \\ l_{20} & l_{21} & l_{22} & 0 & \cdots \\ l_{30} & l_{31} & l_{32} & l_{33} & \cdots \\ \vdots & \vdots & \vdots & \vdots & \ddots & \vdots \\ & & & & \cdots \end{bmatrix} \quad \text{Formula 6-1}$$

$$U = \begin{bmatrix} 1 & u_{01} & u_{02} & u_{03} & \cdots \\ 0 & 1 & u_{12} & u_{13} & \cdots \\ 0 & 0 & 1 & u_{23} & \cdots \\ 0 & 0 & 0 & 1 & \cdots \\ \vdots & \vdots & \vdots & \vdots & \ddots & \vdots \\ & & & & \cdots \end{bmatrix} \quad \text{Formula 6-2}$$

Therefore, Formula 7 shows the received signal Rx when Formula 6-1 is substituted into Formula 5, where the transmission data to the N-th terminal is given as TN.

$$Rx = \begin{bmatrix} l_{00} & 0 & 0 & 0 & \cdots \\ l_{10} & l_{11} & 0 & 0 & \cdots \\ l_{20} & l_{21} & l_{22} & 0 & \cdots \\ l_{30} & l_{31} & l_{32} & l_{33} & \cdots \\ \vdots & \vdots & \vdots & \vdots & \ddots & \vdots \\ & & & & \cdots \end{bmatrix} \cdot \begin{bmatrix} T0 \\ T1 \\ \vdots \\ \vdots \\ TN \\ \vdots \end{bmatrix} \quad \text{Formula 7}$$

Formula 7 shows that there is no interference from another terminal at an 0-th terminal (UE#0). At a 1st terminal (UE#1), the transmission data to the UE#0 is interfering. Similarly, the last terminal UE# (Nv-1) receives interference from other all terminals. However, since all the elements of the upper right half are zero compared with the correlation matrix H×H*, the lower triangular matrix L can reduce the interference amount as a whole.

Here a method for further reducing the interference amount is provided. Here, a new lower triangular matrix $L_{new}$ in Formula 8-1 is used in place of the lower triangular matrix L of Formula 6-1.

$$L_{new_k} = \begin{bmatrix} \frac{l_{00}}{g0} & 0 & 0 & \cdots \\ \frac{l_{10}}{g0} & \frac{l_{11}}{g1} & 0 & \cdots \\ \frac{l_{20}}{g0} & \frac{l_{21}}{g1} & \frac{l_{22}}{g2} & \\ \vdots & \vdots & \vdots & \ddots & \vdots \\ & & & \cdots & l_{ij} \end{bmatrix}_K \quad \text{Formula 8-1}$$

Here, gi represents a gain of the reception of each terminal and k represents a number of subcarriers in the case of modulating by a Orthogonal frequency-division multiplexing (OFDM) method. That is, $L_{new}$ of Formula 8-1 is prepared by all the subcarriers in the case of modulating by OFDM. Compared to Formula 7, Formula 8-1 reduces the interference amount by introducing the reception gain gi for each terminal as a triangular matrix of zeros for all the upper right elements.

When the lower triangular matrix $L_{new}$ of the Formula 8-1 is used, the U matrix given by Formula 6-2 is now given by $U_{new}$ and Formula 8-2.

$$U_{new_k} = \begin{bmatrix} g0 & u_{01} & \cdots \\ 0 & g1 & \cdots \\ 0 & 0 & \cdots \\ \vdots & \vdots & \vdots & \ddots & \vdots \\ & & & \cdots & u_{ij} \end{bmatrix}_K \quad \text{Formula 8-2}$$

The decomposition of the lower triangular matrix L and the upper triangular matrix U shown in Formula 6-1 and Formula 6-2 corresponds in the case where the gain gi in Formula 8-1 and Formula 8-2 is set to 1. The general term of each component of the parts of Formula 8-1 and Formula 8-2 which are not zero, is as follows for every subcarrier component of OFDM considering a matrix element has indices i and j.

$$U_{i,j} = \frac{HH^*_{i,j} - \sum_{s=0}^{j-1} l_{i,s} u_{s,j}}{l_{i,i}} \quad \text{Formula 9-1}$$

$$L_{i,j} = \frac{HH^*_{i,j} - \sum_{s=0}^{j-1} l_{i,s} u_{s,j}}{g_i} \quad \text{Formula 9-2}$$

Here, the gain gi is further explained. The gain gi is a real number and generally the matrix elements l and u are complex numbers. In Formula 8-1, when each gain g0, g1, ... is made larger than one, an interference term reduces. At this time, a reception power corresponding to an interference term becomes small at 1/gi. However, the terminal with many zero terms has a small interference term originally included in a received signal. Therefore, the influence is small even if a corresponding reception power becomes 1/gi. On the other hand, the reception of a terminal with many interference terms takes the large gain gi, and can reduce the reception power.

Moreover, the reception of a terminal with many interference terms can suppress the fall of reception power by setting the corresponding gain gi to a suitable value. In consideration of the dependence of i of the gains gi, it is desirable to set the gains such that the gains reduce with the increase in i. That is, a received voltage $Rx_i$ of a certain i-th terminal is shown by following Formula 10 from Formula 8-1.

$$Rx_i = \sum_{n=0}^{i-1} \frac{l_{i,n}}{g_n} + \frac{l_{i,i}}{g_i} \quad \text{Formula 10}$$

In Formula 10, the second term of a right side is a signal which the terminal i should receive, and the first term is an interference term. Here, the ratio of the reception signal versus the interference of the following received signal pairs is represented by α0 and is given by Formula 11.

$$\alpha 0 = \frac{\sum_{n=0}^{i-1} \frac{l_{i,n}}{g_n}}{\frac{l_{i,i}}{g_i}} \quad \text{Formula 11}$$

Using Formula 11, the gain gi can be determined such that the interference amount becomes less than α0. However, not all terminals are required to satisfy Formula 11. For example, the gain gi may be determined so that only half of the number terminals Nv, represented as Ns, follow Formula 11. This is because the ratio of sufficiently received signal pairs verses the interference amount is obtained, even in the case when a transmitting signal from a terminal is received with many zero components, originally with small interference, and does not perform interference control by the gain gi. By performing this method, the base station can reduce the number of the gains gi that should be determined. Therefore, the computational complexity the base station performs is reduced.

The transmission power from the base station to the small terminal of the gain gi becomes the original gain 1/gi. This leads to an increase of electric power when 1/gi>1. Therefore, the electric power of the terminal with gain gi<1 is reduced conversely, and transmission power of the base station as the whole is fixed. That is, let the following Formula 12 be a constraint condition.

$$\sum_{n=0}^{Nv-1} \frac{1}{gn} < Nv \quad \text{Formula 12}$$

As mentioned above, it is preferable to satisfy each following requirements for a gain gi: (1) gi is a decreasing function with respect to i-th terminal; (2) Formula 11 is satisfied; (3) gi applies only with respect to the terminal after a certain number of terminals Ns, with respect to the terminal number Nv; and (4) Formula 12 is satisfied.

Figure 4:
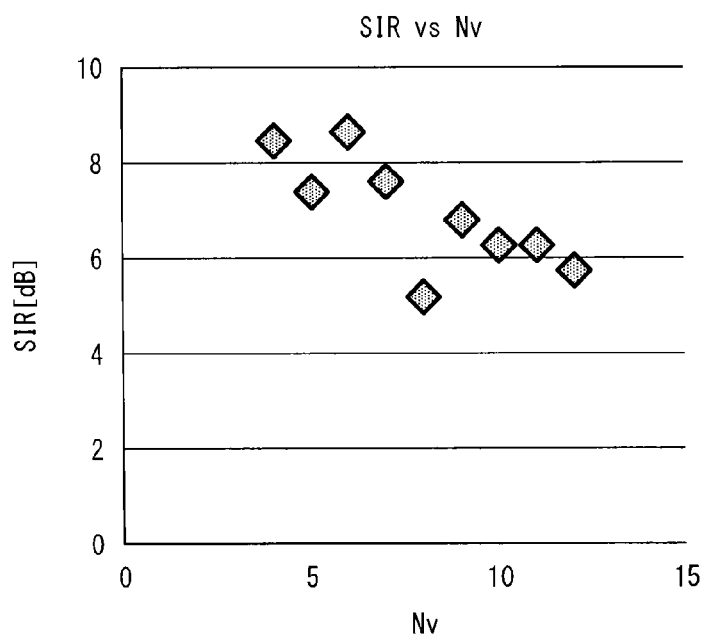
FIG. 4 illustrates an increase in interference proportional to the number of terminals when the number of base station antennas is 100.

FIG. 4 shows a change of signal to interference power ratio (SIR) due to increasing the number of terminals Nv, in the case where the number of antennas Nb of the base station is equal to one hundred. As shown in FIG. 4, when the number of terminals Nv increases, the SIR will deteriorate. In this example, when the number of terminals Nv exceeds four sets, the SIR will fall to an unpreferable value.

Figure 5:
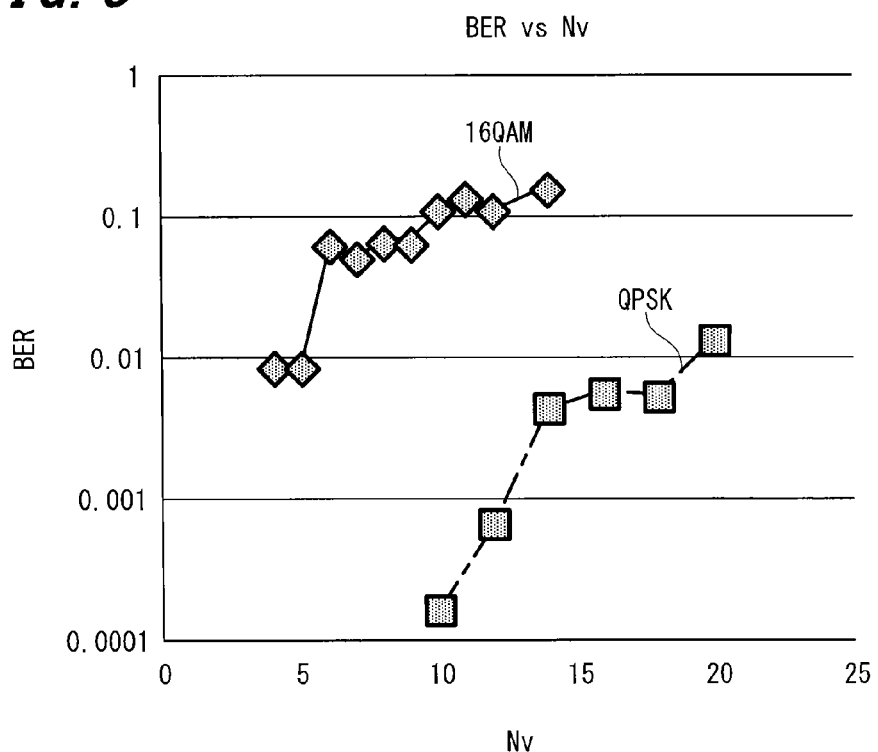
FIG. 5 illustrates a reception bit error rate (BER) in accordance with the number of terminals.

FIG. 5 shows the change of a bit error rate (BER) of a received signal with respect to the number of terminals Nv.

In FIG. 5, an example is shown in the case where the modulation system of the transmitting signal is 16 Quadrature Amplitude Modulation (16QAM) and Quadrature Phase Shift Keying (QPSK) modulation. When the modulation system of transmitting signal is QPSK, a BER<$10^{-2}$ will be maintained with up to about 20 sets of terminals. BER<$10^{-2}$ is the 3G (3rd generation) present mobile telephone system which used the Code Division Multiple Access (CDMA) communication system, and is the same as BER that needs to be maintained when performing an audio communication. This value, BER<$10^{-2}$, becomes a standard when judging the suitability of a communication system.

In the 16QAM modulation system, the modulation of a multi-value higher than QPSK, the condition of BER<$10^{-2}$ is not satisfied for four or more sets of terminals. That is, up to three terminals, a BER<$10^{-2}$ will be satisfied and communication with 16QAM system is attained. However, when the number of terminals are four or more sets, the condition of BER<$10^{-2}$ is not satisfied and the system cannot communicate appropriately. In a data communication with a permissible BER of about BER<$10^{-3}$, about 12 sets of terminals by the QPSK system can simultaneously communicate. In the case of the 16QAM system with the same standard only about four sets of terminals can simultaneously communicate. Thus, in a massive MIMO communication system, the number of terminals which one base station can accommodate will be limited to several sets. When the number of terminals that the base station accommodates exceeds a limit, a data transfer rate is limited to a low speed.

Zero forcing is a method for removing the interference of the transmitting signal completely. This method includes the step of conditioning the transmitting signal Tx by the correlation matrix $(H \times H^*)^{-1}$ as a precode matrix as in Formula 1. Thereby, at a terminal, the signal is diagonalized and the interference is removed. However, since the correlation matrix $H \times H^*$ turns into a matrix of ($Nv \times Nv$) about the terminal number $Nv$, the computational complexity increases with the increase in a number of terminals. Moreover, a computational period currently assumed with the massive MIMO communication system is about 500 μS; therefore, high speed calculations within that computational period is needed.

Figure 6:
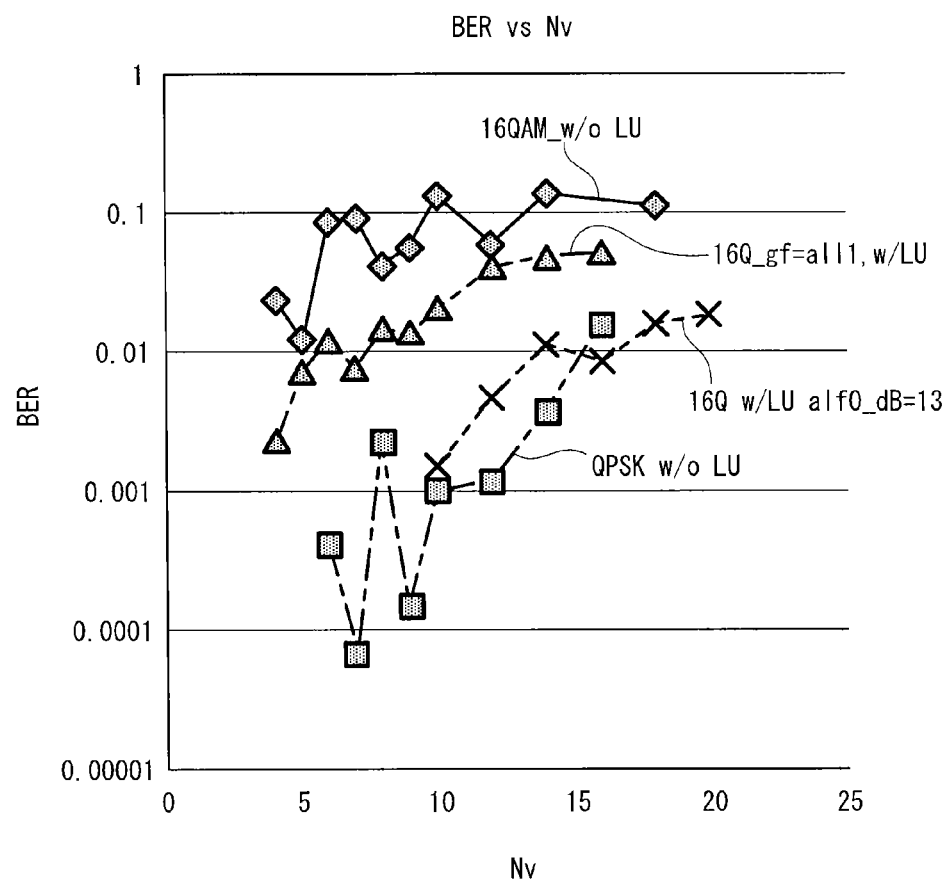
FIG. 6 illustrates advantages by an embodiment of the present disclosure.

FIG. 6 (FIG. 6) shows an example of the simulated communication processing explained so far according to an exemplary embodiment. In this example the array antenna 110 of one base station is equipped with 100 antennas, and the BER of all the terminals is shown with increasing the number of terminals $Nv$ in the cell. Here, the characteristic response of "16QAM_w/o LU" and the characteristic response of "QPSK w/o LU" are the same as shown in FIG. 5. The curves differ in FIG. 5 and FIG. 6 due to the differing values of random numbers used at the time of simulation. Here, characteristic "16Q_gf=all1 w/LU" is an example characteristic at the time of applying the method according to the disclosure. In this case, all of the gains gi were set to "1" in Formula 8-1 and Formula 8-2, and 16QAM modulation was carried out for all subcarriers in the case of modulating by OFDM. That is, the characteristic "16Q_gf=all1 w/LU" is a case where the Formula 6-1 and the Formula 6-2 are used. In this case, the BER improved compared with the characteristic of FIG. 5. However, with five or more sets of terminals, it does not become error free, i.e., a BER is not set to 0. Moreover, the amount of improvement becomes to such an extent that a BER becomes 1/several. An improvement of this level cannot maintain predominance and will depend on the wireless communication environment.

The characteristic "16Q w/LU alf0_dB=13" of FIG. 6 is a case where $\alpha 0 = -13$ dB according to Formula 11, and is reflected when $n0 = Nv/2$. In this case, with ten or fewer sets of terminals, BER becomes error free. Moreover, in this case, even when the number of terminals exceeds ten sets, the BER will be the same as in the case modulated by QPSK.

Further details of the method used in the determination of the gain gi of Formula 11 are as follows. First, all the gains gi are set to "1" as an initial value, and the gain gi is sequentially determined in order about $n0 = Nv/2$ or subsequent ones. That is, in the case with terminal number $Nv = 16$, about the terminal of $i = 9$, a gain gi is decided using gi=1 ($i < 9$), for example. The gain g10 ($i = 10$) of the terminal of $i = 10$ can also be determined from the gain gi=1 ($i < 8$) and the gain g9 ($i = 9$). Finally, about the gain gi ($i > 8$), the condition of Formula 12 is used, and the gain is divided equally, determining the remaining gains gi ($i < 8$). With such a method, the gain gi can be determined by small computational complexity.

Although various methods of calculating the optimal solution of the gain gi, by which Formula 11 and Formula 12 are satisfied, may be considered by the conventional method, few methods are available that meet the requirements for an optimal solution by the increase in the terminal number and the convergence of a solution takes time. Therefore, simplification by this method is important.

Figure 7:
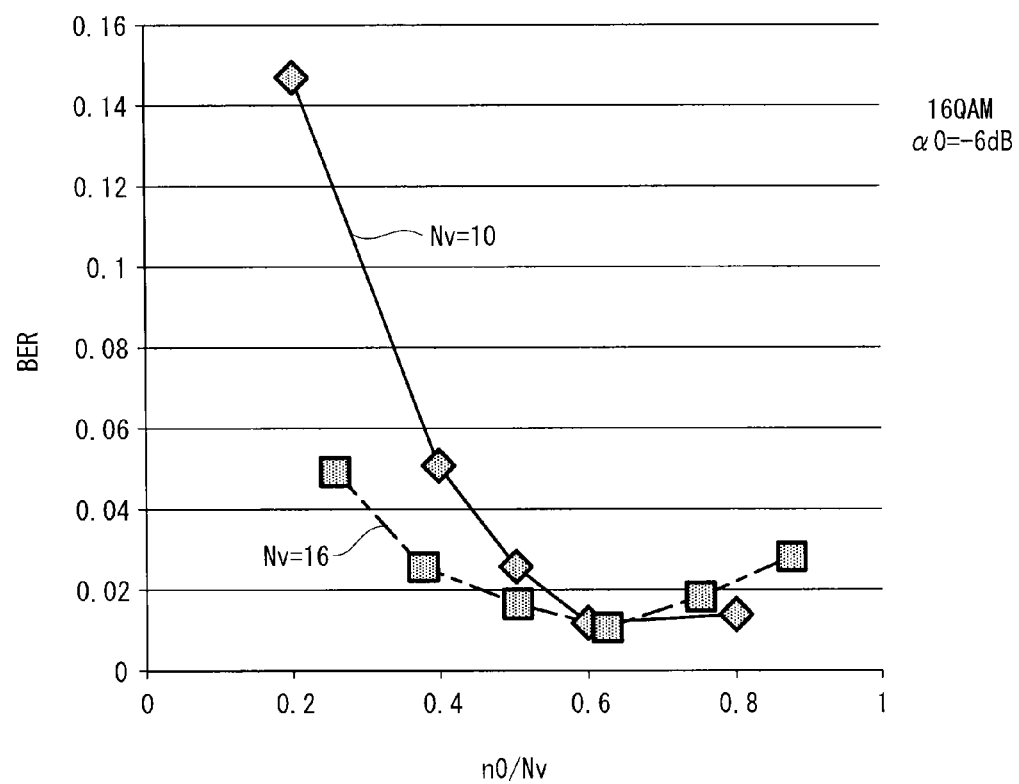
FIG. 7 illustrates the influence of the number of terminals that give interference to be considered when determining $\alpha 0$.

FIG. 7 (FIG. 7) illustrates the n0 dependency on the BER. FIG. 7 illustrates BER with respect to n0/Nv in the cases where the number of terminals $Nv=10$ and 16. Here, it is assumed that $\alpha 0 = -6$ dB and 16QAM modulation is used. $\alpha 0$ was set large in order to make a large error and to increase the simulation precision. In both cases, the minimum value of the BER is obtained when $n0 = Nv/2$.

Here, the method of determining $\alpha 0$ is based on the following. For example, when 16QAM modulation is applied, all of the interference terms act as a noise. Therefore, an energy per bit to noise power spectral density ratio (EbN0), which obtains a desired BER, is selected as $\alpha 0$ from the characteristic of BER with respect to the EbN0 of 16QAM, which is generally well known.

Figure 8:
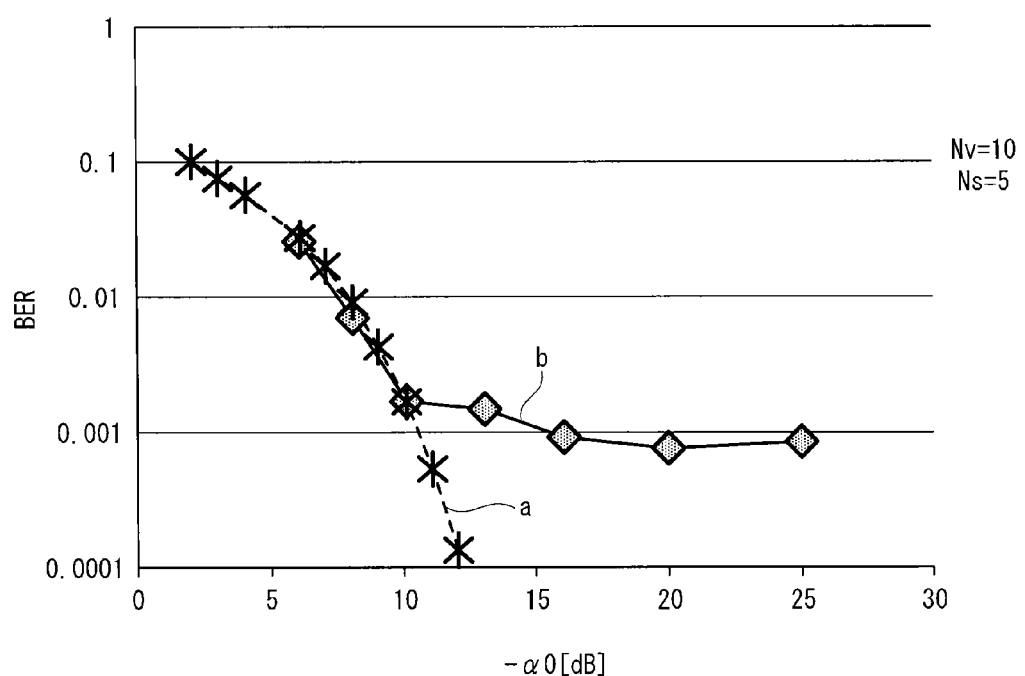
FIG. 8 illustrates a relationship between the BER and $\alpha 0$ in the present disclosure.

FIG. 8 (FIG. 8) illustrates a comparison between BER of the present embodiment, line (a) and theoretical value of BER of 16QAM with respect to the EbN0, line (b). That is to say, a change in BER is simulated when $\alpha 0$ is changed. In the theoretical value, the calculation is performed with $\alpha 0 = EbN0$, $Nv=10$, and $Ns=5$ ($=Nv/2$). The characteristic lines (a) and (b) substantially correspond up until about $\alpha 0 = -10$ dB. This result demonstrates that it is effective to use the characteristic for the EbN0 in order to determine $\alpha 0$. In this regard, when $\alpha 0 < -10$ dB, the BER deviates from the theoretical value greatly and no improvement of BER is observed. This is because the interference will be reduced when $\alpha 0$ is made small, but the level of confidence of the received signal also deteriorates, as previously described.

Here, the algorithm of the inverse matrix of Formula 4 is explained in further detail. In the massive MIMO communication method, the calculation of the inverse matrix of the matrix having a size of $Nv \times Nv$ is needed. Normally, this calculation requires many procedures and time. However, in the present disclosure, since the matrix $U_{new}$ of Formula 8-2 is a triangular matrix, this calculation can be performed very easily. That is, the inverse matrix $U_{new}^{-1}$ of the matrix $U_{new}$ is described by Formula 13.

$$Unew_k^{-1} = \begin{bmatrix} \frac{1}{u00} & x01 & \cdots & \vdots \\ 0 & \frac{1}{u11} & \cdots & \\ 0 & 0 & \ddots & \\ \vdots & \vdots & & xij \end{bmatrix}_K \quad \text{Formula 13}$$

Here, the element xij in Formula 13 is shown by Formula 14.

$$x_{ij} = \frac{-\sum_{n=i+1}^{j} u_{i,n} x_{n,j}}{u_{i,i}} \quad \text{Formula 14}$$

When the Formula 14 is calculated in descending order of i, it is possible to uniquely obtain a solution without repetition and convergence calculation.

Examples of alternate embodiments of this disclosure are described here. In a first alternate example, a diagonal matrix G, which has the gain gi in a diagonal element, is given by Formula 15.

$$G = \begin{bmatrix} g0 & & 0 \\ & g1 & \\ 0 & & \ddots \\ & & & \ddots \end{bmatrix} \quad \text{Formula 15}$$

In accordance with Formula 5, since the received signal from a base station becomes a lower triangular matrix, it remains as a triangular matrix and the interference can be adjusted by the gain gi by multiplying by the diagonal matrix G in Formula 15. That is, by using $U^{-1} \times G$ as a precode matrix, the received signal is given by Formula 16.

$$Rx = H^* H^{**} U^{-1*} G^* Tx = L^* U^* U^{-1*} G^* Tx = L^* G^* Tx \quad \text{Formula 16:}$$

Thereby, Formula 11 can be applied to the diagonal matrix G, and the interference can be controlled.

Next, a second alternate example of an embodiment of this disclosure is explained. Here, an uplink signal is considered as the received signal by the base station transmitted by the mobile terminal and is represented by Formula 17.

$$Rx = H^* Tx \quad \text{Formula 17:}$$

In this example, the triangular factorization of Formula 3 is applied to the uplink signal. That is, the inverse matrix $L^{-1}$ of the lower triangular matrix L, is multiplied to the uplink signal as a post-code matrix, and is given by Formula 18.

$$Rx = L^{-1*} H^* H^{**} Tx = U^* Tx \quad \text{Formula 18:}$$

Thereby, the interference of the uplink signal can be reduced in half by average, similar to the process of Formula 5.

Next, a third alternate example of an embodiment of this disclosure is explained. The uplink signal given in Formula 18 in the modified example 2 above is considered here. In Formula 18, the interference was estimated in a base station with respect to the transmitting signal each terminal transmits using Formula 11, resulting in the diagonal matrix G of Formula 15. The gain gi corresponding to each terminal was determined. If each terminal transmits a transmitting signal conditioned by this gain gi and by the gain gi in Formula 15, which was multiplied to the base station, the base station will receive the signal as follows in Formula 18.

$$Rx = U^* G^* Tx \quad \text{Formula 19:}$$

Here, U is an upper triangular matrix and G is a diagonal matrix; therefore, Formula 19 results in an upper triangular matrix. In this case, since the interference term is controlled by the diagonal matrix G, the interference can be reduced, as compared with the case where Formula 18 is applied alone.

According to the present disclosure, triangular decomposition is performed on a channel correlation matrix $H \times H^*$, and a transmission signal is multiplied by the inverse matrix of the upper triangular matrix thereof as a precode matrix. Each element $U_{ij}$ of the upper triangular matrix of the triangular matrix is multiplied by a gain gi, and an element $L_{ij}$ of the lower triangular matrix is multiplied by a gain 1/gi. The limitation of the number of terminals that can be accommodated is eased by setting inverse-matrix $L^{-1}$ of the lower triangular matrix L as the precode matrix.

Moreover, since the amount of interference is reduced, a higher-order modulation like 16QAM can be applied, and both the channel capacity and transmission speed can be increased. Also, it is possible to obtain advantages of diagonalization by auto-correlation, and noise reduction, which are characteristics of the massive MIMO communication system, and to obtain great advantage of achieving an increase in the channel capacity.

Furthermore, according to this disclosure, interference can be reduced by half using an upper triangular matrix also during the uplink from a terminal to a base station, and therefore, interference can be further reduced by performing gain control at the time of transmission from a terminal.

Obviously, numerous modifications and variations of the present disclosure are possible in light of the above teachings. It is therefore to be understood that within the scope of the appended claims, the disclosure may be practiced otherwise than as specifically described herein.

The invention claimed is:

1. A base station comprising:
    a data control circuitry configured to process a transmission signal to be simultaneously transmitted to a plurality of mobile terminals;
    a modulator circuitry configured to modulate the transmission signal processed by the data control circuitry;
    a radio frequency modulator circuitry configured to modulate the transmission signal modulated by the modulator circuitry into a radio frequency transmission signal; and
    a plurality of antennas configured to wirelessly transmit the radio frequency transmission signal to the plurality of mobile terminals, wherein
    the data control circuitry is configured to
    generate a channel matrix H which is equal to Nv×Nb, a number of the plurality of mobile terminals to which the transmission signal is to be transmitted being Nv and a number of the plurality of antennas being Nb;
    generate a channel correlation matrix $H \times H^*$, where * represents a complex conjugate transpose;
    triangular-factorize the channel correlation matrix $H \times H^*$, whereby a lower triangular matrix L is obtained;
    multiply each element $L_{ij}$ of the lower triangular matrix L by 1/gi to obtain a new lower triangular matrix $L_{new}$, a reception gain of each of the plurality of mobile terminals being gi;
    generate an inverse matrix of the new lower triangular matrix $L_{new}$, the inverse matrix of the new lower triangular matrix $L_{new}$ serving as a precode matrix; and multiply the transmission signal by the precode matrix.

2. The base station according to claim 1, wherein the data control circuitry is further configured to:
triangular-factorize a channel correlation matrix H×H*, where * represents a complex conjugate transpose, whereby an upper triangular matrix U is obtained; and
multiply the transmission signal by an inverse matrix $U^{-1}$ of the upper triangular matrix U, wherein the inverse matrix $U^{-1}$ of the upper triangular matrix U serves as the precode matrix.

3. The base station according to claim 1, wherein the reception gain gi is set so that a sum of interference terms to the mobile terminals are included.

4. The base station according to claim 3, wherein, in a case that the sum of interference terms is calculated, an interfering mobile terminal is limited to a specific mobile terminal.

5. The base station according to claim 1, wherein a total transmission power is maintained to be constant by reducing the gain of the transmission signal for each mobile terminal that is not an interfering mobile terminal.

6. The base station according to claim 1, wherein a diagonal matrix with the number of the plurality of mobile terminals as its order serves as the precode matrix.

7. The base station according to claim 1, wherein the data control circuitry is further configured to multiply a transmission signal transmitted from the mobile terminals by a post-code matrix to perform reception processing on the transmission signal transmitted from the mobile terminals.

8. The base station according to claim 7,
wherein
the inverse matrix $L^{-1}$ of the lower triangular matrix L serves as the post-code matrix.

9. The base station according to claim 7, wherein a gain provided to each mobile terminal serves as the post-code matrix.

10. The base station according to claim 1, wherein the base station is connected to an external network through a base station control circuitry.

11. A massive MIMO communication method comprising:
generating, using circuitry, a channel matrix H that is equal to Nv×Nb, with each element in H corresponding to the respective transmission signal, a number of a plurality of mobile terminals to which a transmission signal is to be transmitted being Nv and a number of a plurality of antennas being Nb;
generating a channel correlation matrix H×H*, where * represents a complex conjugate transpose;
triangular-factorizing the channel correlation matrix H×H*, whereby a lower triangular matrix L is obtained;
multiplying each element $L_{ij}$ of the lower triangular matrix L by 1/gi to obtain a new lower triangular matrix $L_{new}$, a reception gain of each of the plurality of mobile terminals being gi;
generating an inverse matrix of the new lower triangular matrix $L_{new}$, the inverse matrix of the new lower triangular matrix $L_{new}$ serving as a precode matrix;
modulating the transmission signal by multiplying the transmission signal by the precode matrix;
modulating the modulated transmission signal by a radio frequency modulator into a radio frequency transmission signal; and
transmitting the radio frequency transmission signal by the antenna to the plurality of mobile terminals.

12. The method in claim 11, wherein, in a case that the upper triangular matrix U is obtained, the inverse matrix $U^{-1}$ of the upper triangular matrix U serves as the precode matrix.

13. A non-transitory computer readable medium including executable instructions, which when executed by a computer cause the computer to:
generate, a channel matrix H that is equal to Nv×Nb, with each element in H corresponding to the respective transmission signal, a number of a plurality of mobile terminals to which a transmission signal is to be transmitted being Nv and a number of a plurality of antennas being Nb;
generate a channel correlation matrix H×H*, where * represents a complex conjugate transpose;
triangular-factorize the channel correlation matrix H×H*, whereby a lower triangular matrix L is obtained;
multiply each element $L_{ij}$ of the lower triangular matrix L by 1/gi to obtain a new lower triangular matrix $L_{new}$, a reception gain of each of the plurality of mobile terminals being gi;
generate an inverse matrix of the new lower triangular matrix $L_{new}$, the inverse matrix of the new lower triangular matrix $L_{new}$ serving as a precode matrix;
modulate the transmission signal by multiplying the transmission signal by the precode matrix;
modulate the modulated transmission signal by a radio frequency modulator into a radio frequency transmission signal; and
transmit the radio frequency transmission signal by the antenna to the plurality of mobile terminals.

14. The non-transitory computer-readable medium including computer program instructions as in claim 13, the executable instructions further causing the computer to:
in a case that the upper triangular matrix U is obtained, use the inverse matrix $U^{-1}$ of the upper triangular matrix U as the precode matrix.

* * * * *